US006950725B2

(12) United States Patent
von Kannewurff et al.

(10) Patent No.: US 6,950,725 B2
(45) Date of Patent: Sep. 27, 2005

(54) HOME LATCH-KEY WEB BASED AUTOMATION SYSTEM

(75) Inventors: Michael C. von Kannewurff, Middlebury, CT (US); Jeffrey A. Goodman, West Hartford, CT (US); Mark F. Culler, Kensington, CT (US); Scott C. Evans, Burnt Hills, NY (US); Roger J. Morgan, Farmington, CT (US); John J. Dougherty, Collegeville, PA (US); Daniel J. DellaVecchia, Burlington, CT (US); Kenneth B. Welles, II, Scotia, NY (US); Matthew D. Dougherty, Southington, CT (US)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 09/683,284

(22) Filed: Dec. 7, 2001

(65) Prior Publication Data

US 2003/0200009 A1 Oct. 23, 2003

(51) Int. Cl.[7] .............................................. G05B 13/00
(52) U.S. Cl. ........................... 700/275; 700/19; 340/5.2
(58) Field of Search .......................... 700/275, 17, 19, 700/276, 284; 62/127; 455/410, 405; 709/217, 219, 250, 249; 345/733; 340/541, 5.2, 539.1, 539.14, 426.16, 539.4; 715/733

(56) References Cited

U.S. PATENT DOCUMENTS

| 4,446,454 A | 5/1984 | Pyle |
| 4,665,544 A | 5/1987 | Honda et al. |
| 4,808,841 A | 2/1989 | Ito et al. |
| 4,907,079 A | 3/1990 | Turner et al. |
| 4,959,713 A | 9/1990 | Morotomi et al. |
| 4,989,081 A | 1/1991 | Miyagawa et al. |

(Continued)

OTHER PUBLICATIONS

"Simply Closer to Home" at URL http://www.beathome.com/index.asp; 2 pages as of Nov. 14, 2001; © 2001, BeAtHome.com, Inc.

"BeAtHome Select System" at URL http//www.beathome.com/products/main.html; 2 pages as of Nov. 14, 2001; © 2001,BeAtHome.com, Inc.

*Primary Examiner*—Leo Picard
*Assistant Examiner*—Steven R. Garland
(74) *Attorney, Agent, or Firm*—Armstrong Teasdale LLP

(57) ABSTRACT

A method of monitoring and automating a home using a network-based system is provided. The system employs a server system coupled to a centralized database, at least one client system, and a plurality of sensors positioned throughout the home. The method includes receiving monitoring and automation (M&A) information from the client system, storing M&A information into the centralized database, cross-referencing M&A information, updating the centralized database periodically to maintain M&A information, monitoring M&A information within the home through the plurality of sensors, performing M&A tasks in the home using the plurality of sensors based on M&A information inputted into the client system and monitored M&A data, and notifying a home owner of the monitored M&A data and the M&A tasks performed within the home.

44 Claims, 7 Drawing Sheets

U.S. PATENT DOCUMENTS

| | | |
|---|---|---|
| 5,086,385 A | 2/1992 | Launey et al. |
| 5,113,294 A | 5/1992 | Kim |
| 5,237,305 A | 8/1993 | Ishikuro et al. |
| RE34,895 E | 4/1995 | Morotomi et al. |
| 5,510,975 A | 4/1996 | Ziegler, Jr. |
| 5,544,036 A | 8/1996 | Brown, Jr. et al. |
| 5,579,221 A | 11/1996 | Mun |
| 5,621,662 A | 4/1997 | Humphries et al. |
| 5,761,083 A | 6/1998 | Brown, Jr. et al. |
| 5,786,767 A | 7/1998 | Severino |
| 5,822,012 A | 10/1998 | Jeon et al. |
| 5,854,588 A | 12/1998 | Dockery |
| 6,060,994 A | 5/2000 | Chen |
| 6,061,602 A | 5/2000 | Meyer |
| 6,064,303 A | 5/2000 | Klein et al. |
| 6,104,785 A | 8/2000 | Chen |
| 6,107,918 A | 8/2000 | Klein et al. |
| 6,134,303 A | 10/2000 | Chen |
| 6,140,987 A | 10/2000 | Stein et al. |
| 6,232,260 B1 | 5/2001 | Nagy et al. |
| 6,453,687 B2 * | 9/2002 | Sharood et al. ............... 62/127 |
| 6,529,723 B1 * | 3/2003 | Bentley ..................... 455/405 |
| 6,542,077 B2 * | 4/2003 | Joao ..................... 340/426.16 |
| 2002/0111698 A1 * | 8/2002 | Graziano et al. ............. 700/17 |
| 2003/0056012 A1 * | 3/2003 | Modeste et al. ............ 709/249 |

\* cited by examiner

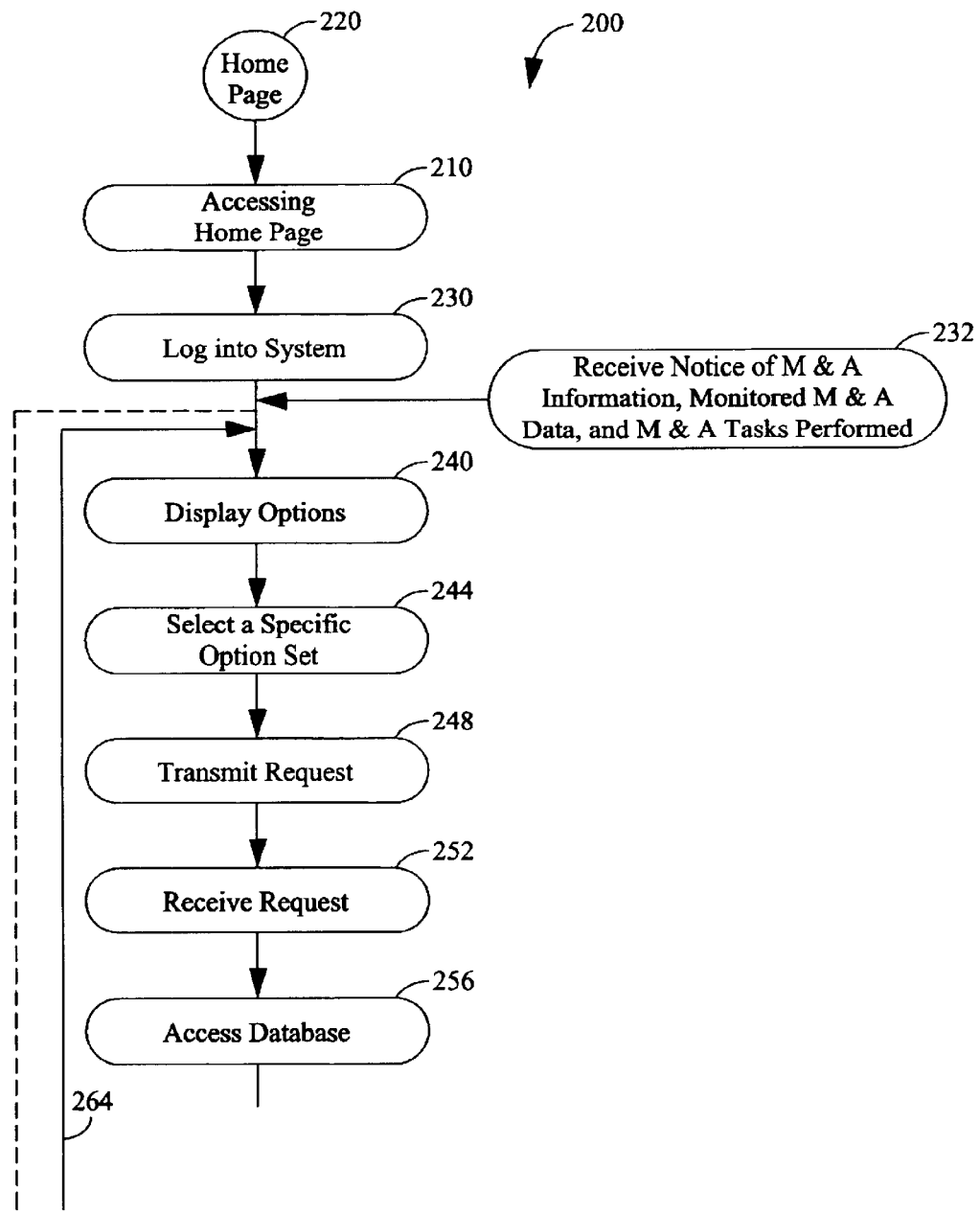
FIG. 4A  ↓ FIG. 4B

HOME LATCH-KEY WEB BASED AUTOMATION SYSTEM

BACKGROUND OF INVENTION

This invention relates generally to home monitoring and automation systems, and more particularly, to home latch-key automation systems.

There is nothing new about children being on their own at home. The phrase latch-key children originated in the early 1800's, when youngsters who were responsible for their own care, wore a house key on a string around their necks. Today, however, with an increasing number of parents working outside the home, there are more children who are at home alone after school.

Working parents that have latch-key children are concerned about obvious dangers like access to firearms, adult beverages, swimming pools, and appliances. Other concerns may pertain to who may enter the house or apartment, and whether a child is permitted to bring a friend to the home. Another concern may be the child's access to prohibited areas of the house. Ultimately, the main concern of most parents is for their child's safety, including knowing when the child arrived home, what the child is doing at home, if any visitors or intruders are at the home, that all utilities and appliances are functioning properly, and all doors are secured and locked. In addition to the safety of their children, it is a concern for working parents to provide service people access to a home. More specifically, sometimes it is difficult to leave work to let a service provider into the home or apartment. Currently, at least some known home security systems require security codes for activation and deactivation. Such systems are often remotely monitored, but may be ineffective for young children that must memorize activation and deactivation procedures.

SUMMARY OF INVENTION

In one aspect, a method of monitoring and automating a home using a network-based system is provided. The system employs a server system coupled to a centralized database, at least one client system, and a plurality of sensors positioned throughout the home. The method includes receiving monitoring and automation (M&A) information from the client system, storing M&A information into the centralized database, cross-referencing M&A information, updating the centralized database periodically to maintain M&A information, monitoring M&A information within the home through the plurality of sensors, performing M&A tasks in the home using the plurality of sensors based on M&A information inputted into the client system and monitored M&A data, and notifying a home owner of the monitored M&A data and the M&A tasks performed within the home.

In another aspect, a method of monitoring and automating a home using a network-based system is provided. The system employs a server system coupled to a centralized database, at least one client system, a plurality of sensors positioned throughout the home, and a service provider system. The method includes receiving M&A information from the client system, storing M&A information into the centralized database, cross-referencing M&A information, updating the centralized database periodically to maintain M&A information, monitoring M&A information within the home through the plurality of sensors, performing M&A tasks in the home through the plurality of sensors based on M&A information inputted into the client system and monitored M&A data, notifying a home owner of the monitored M&A data and the M&A tasks performed within the home, and contacting the service provider system to request and schedule a service to be performed on a monitored device within the home based on the M&A information inputted into the client system and the monitored M&A data.

In another aspect, a network-based system for monitoring and automating a home is provided. The system includes a client system with a browser, a centralized database for storing information, a plurality of sensors positioned throughout the home, and a server system configured to be coupled to the client system and the database. The server system is further configured to receive M&A information from the client system, store M&A information into the centralized database, cross-reference M&A information, update the centralized database periodically to maintain M&A information, monitor M&A information within the home through the plurality of sensors, perform M&A tasks in the home through the plurality of sensors based on M&A information inputted into the client system and monitored M&A data, and notify a home owner of the monitored M&A data and the M&A tasks performed within the home.

BRIEF DESCRIPTION OF DRAWINGS

FIG. 4A is a first portion of a flowchart illustrating an exemplary processes that may be employed by the system shown in FIG. 1.

DETAILED DESCRIPTION

Figure 1:
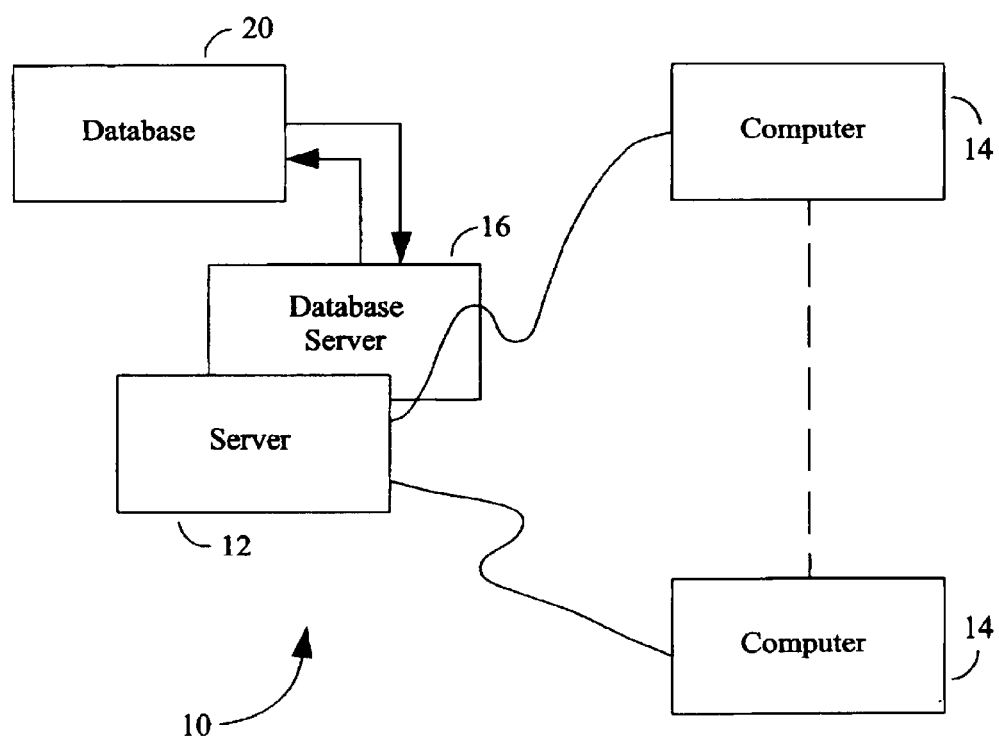
FIG. 1 is a simplified block diagram of a home monitoring and automating system in accordance with one embodiment of the present invention.

Exemplary embodiments of systems and processes that facilitate integrated network-based monitoring and automation of a home (not shown in FIG. 1) are described below in detail. The systems and processes facilitate, for example, monitoring and automating a home using a client system, a server system coupled to a centralized database, and a plurality of sensors that are positioned throughout the home and on the surrounding property. The system allows a home owner to monitor and control monitoring and automation (M&A) information through a client system. The M&A information includes at least one of a layout of the house, a layout of any buildings on the property, a description of the property, and information relating to at least one of lights, locks, doors, windows, drapes, appliances, utilities, furnace, air conditioner, medical devices, security systems, irrigation systems, smoke detectors, thermostats, sound system, swimming pool, occupancy, and access restrictions within the home and surrounding property.

In the exemplary embodiment, the system collects, tracks, displays, monitors, schedules, and disseminates real time M&A information for a home and surrounding property.

M&A information includes the condition of at least one of walls, floors, ceilings, lights, locks, doors, windows, drapes, appliances, utilities, furnace, air conditioner, medical devices, security systems, irrigation systems, smoke detectors, thermostats, sound system, swimming pool, driveway, occupancy, and access restrictions within the home and on the surrounding property. In addition, after the system collects and monitors M&A data, the system performs M&A tasks within the home and on the surrounding property through a plurality of sensors positioned within the home based on the M&A information and the monitored M&A data. The system also electronically notifies the home owner, providing the home owner with the monitored M&A data and a report of the M&A tasks performed within the home. Lastly, the system is capable of monitoring a plurality of items in the home and on the surrounding property, such that an item requiring service can be detected. After the system detects an item that requires service, the system can electronically contact a service provider, and advise the service provider of the service required. Furthermore, the system can schedule a service call for that item with a service provider. The required and scheduled can include, but is not limited to, for example, maintenance or repair work on a monitored item within the home or on the surrounding property, e.g., a dishwasher that requires repair work, or it can include replenishing supplies or products used within the home or on the surrounding property, e.g., food supplies, household cleaning supplies, or swimming pool supplies, that are monitored by the system.

M&A information relating to a home is received by the system which stores M&A information in a database, cross-references M&A information received, and then updates the database with M&A information received. The system also monitors M&A information within the home through the plurality of sensors, and performs M&A tasks in the home through the plurality of sensors based on M&A information and monitored M&A data. Additionally, the system notifies a home owner of monitored M&A data and M&A tasks performed, and contacts a service provider system to request and schedule a service to be performed on a monitored device. Because M&A information is stored in the database, the network-based system provides convenient access to M&A information, and allows a home owner to monitor and automate a home. More specifically, a user is prompted by the system to input an address of a home being monitored. In an exemplary embodiment, an authorized user can access M&A information for each home included on the system.

In one embodiment, the system is a computer program embodied on a computer readable medium and stored on a database. In another embodiment, the system is a computer program embodied on a computer readable medium implemented utilizing a Structured Query Language (SQL) with a client user interface front-end for administration and a web interface for standard user input and reports. In an exemplary embodiment, the system is web-enabled and is run on an intranet. In yet another embodiment, the system is fully accessed by individuals having an authorized access outside the firewall of the intranet through the Internet. In a further exemplary embodiment, the system is being run in a Windows NT® environment, which is commercially available from Microsoft Corporation, Redmond, Wash., or other similar computer application. In a further exemplary embodiment, the system is remotely controlled through at least one of a cell phone and a Personal Digital Assistant (PDA). The application is flexible and designed to run in various different environments without compromising any major functionality.

The systems and processes are not limited to the specific embodiments described herein. Rather, components of each system and each process can be practiced independent and separate from other components and processes described herein. Each component and process also can be used in combination with other assembly packages and processes.

FIG. 1 is a simplified block diagram of a system 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
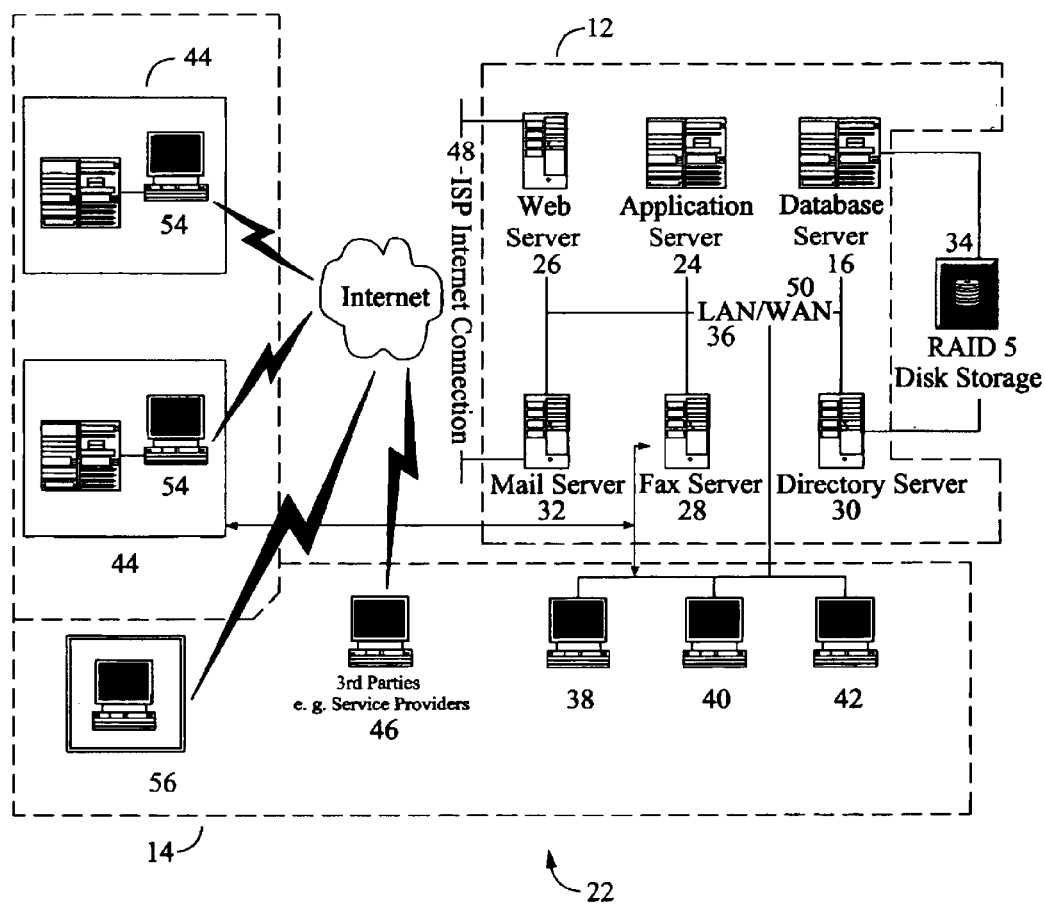
FIG. 2 is an expanded version block diagram of an exemplary embodiment of a server architecture of the system shown in FIG. 1.

FIG. 2 is an expanded version block diagram of an exemplary embodiment of a server architecture of a system 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server system 12 is configured to be communicatively coupled to various individuals, including home owners 44 and to third parties, e.g., service providers, 46 via an ISP Internet connection 48. The communication in the exemplary embodiment illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual having a workstation 54 can access system 22. At least one of the client systems includes a service provider workstation 56 located at a remote location. Work stations 54 and 56 are personal computers having a web browser. Also, work stations 54 and 56 are configured to communicate with server system 12. Furthermore, fax server 28 communicates with remotely located client systems, including a client system 56 via a telephone link. Fax server 28 is configured to communicate with other client systems 38, 40, and 42 as well.

Figure 3:
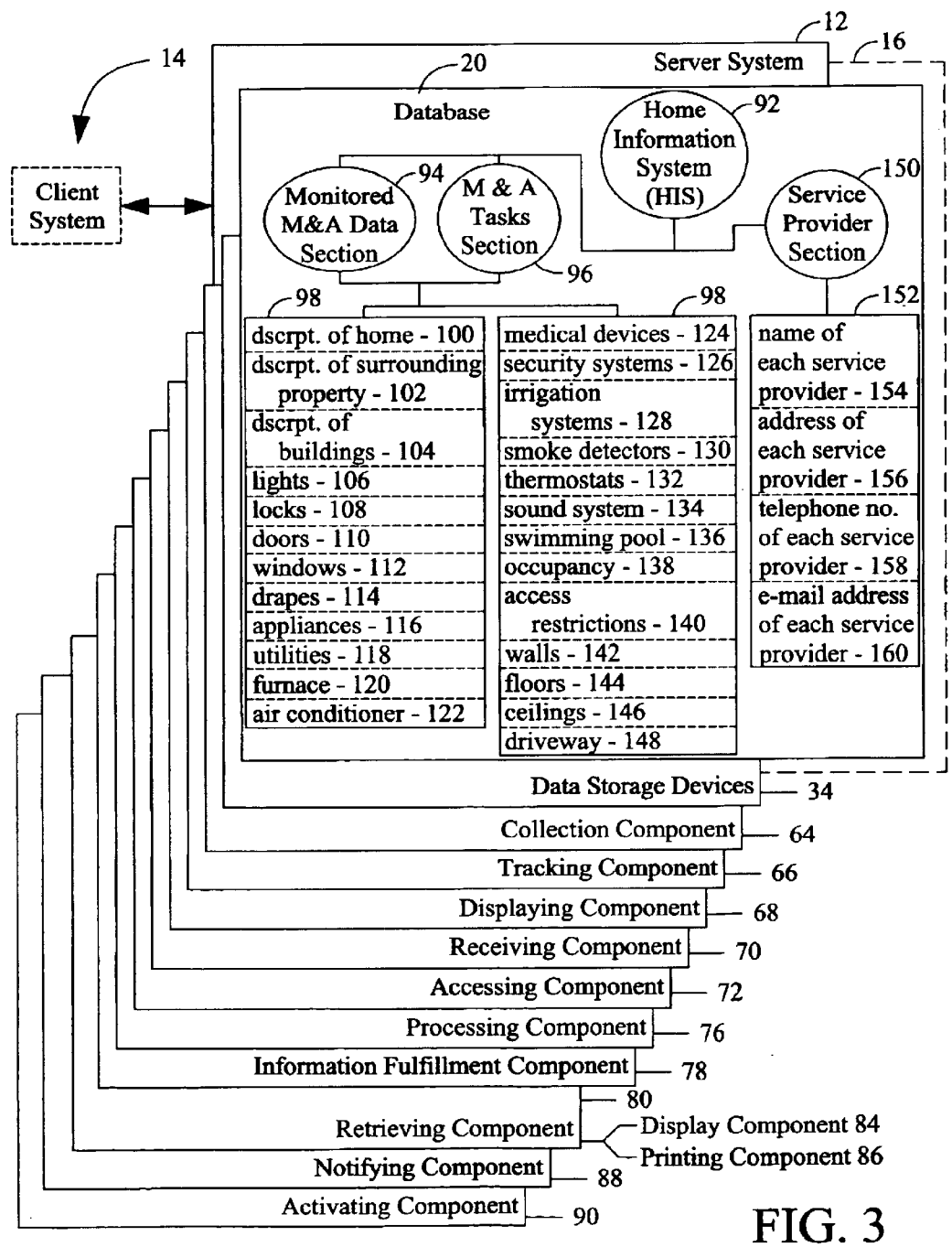
FIG. 3 illustrates an exemplary configuration of a database within the database server of the server system including other related server components.

FIG. 3 illustrates an exemplary configuration of database 20 within database server 16 of server system 12 shown in FIG. 1. Database 20 is coupled to several separate computer software components within server system 12, which perform specific tasks. Server system 12 includes a collection component 64 for collecting data in database 20, a tracking component 66 for tracking data, and a displaying component 68 to display information. Tracking component 66 tracks and cross-references data, including modifying existing data. Server system 12 also includes a receiving component 70 to receive information and data from client system 14, and an accessing component 72 to access database 20 within data storage device 34. Receiving component 70 is programmed for receiving information and data from one of a plurality of client systems 14. Server system 12 further includes a processing component 76 for searching and processing received information and data against database 20 containing a variety of information collected by collection component 64. An information fulfillment component 78, located in server system 12, downloads requested information to the plurality of users in response to a request received by receiving component 70. Information fulfillment component 78 downloads the information after the information is retrieved from database 20 by a retrieving component 80. Retrieving component 80 retrieves, downloads and sends information to client system 14 based on a request received from client system 14.

Retrieving component 80 also includes a display component 84 configured to download information to be displayed on a client system's graphical user interface and a printing component 86 configured to print information. Retrieving component 80 generates reports requested by the user through client system 14 in a pre-determined format. System 10 is flexible and provides other alternative types of reports and is not constrained to the options set forth above.

Server system 12 also includes a notifying component 88 and an activating component 90. Notifying component 88 electronically transmits a message to client system 14 based on a request inputted into client system 14 and transmitted to server system 12 notifying a user of monitored M&A data and M&A tasks performed within the home. Activating component 90 electronically activates and deactivates the plurality of sensors positioned throughout the home and on the surrounding property based on M&A information and monitored M&A data.

In one embodiment, collection component 64, tracking component 66, displaying component 68, receiving component 70, processing component 76, information fulfillment component 78, retrieving component 80, display component 84, printing component 86, notifying component 88, and activating component 90 are computer programs embodied on computer readable medium.

Database 20 contains a Home Information Section (HIS) 92 for each home connected to server system 12. HIS 92 is divided into a monitored M&A data section 94 and a M&A tasks section 96. HIS 92 also includes M&A information 98 relating to the home including a description of the home 100, a description of the surrounding property 102, a description of any buildings on the property 104, and information relating to at least one of lights 106, locks 108, doors 110, windows 112, drapes 114, appliances 116, utilities 118, furnace 120, air conditioner 122, medical devices 124, security systems 126, irrigation systems 128, smoke detectors 130, thermostats 132, sound system 134, swimming pool 136, occupancy 138, and access restrictions 140 within the home and surrounding property.

System 10 (shown in FIG. 1) monitors M&A information 98 within the home through a plurality of sensors and stores the monitored data in monitored M&A data 94. The sensors are positioned throughout the home and on the surrounding property including on at least one of walls 142, floors 144, ceilings 146, lights 106, locks 108, doors 110, windows 112, drapes 114, appliances 116, utilities 118, furnace 120, air conditioner 122, medical devices 124, security systems 126, irrigation systems 128, smoke detectors 130, thermostats 132, sound system 134, swimming pool 136, and driveway 148 such that condition of walls 142, floors 144, ceilings 146, lights 106, locks 108, doors 110, windows 112, drapes 114, appliances 116, utilities 118, furnace 120, air conditioner 122, medical devices 124, security systems 126, irrigation systems 128, smoke detectors 130, thermostats 132, sound system 134, swimming pool 136, and driveway 148 is recorded.

System 10 also performs tasks within the home through the plurality of sensors. M&A information 98 relating to these tasks is stored in M&A tasks 96. System 10 performs M&A tasks by positioning a plurality of sensors throughout the home and on the surrounding property including on at least one of lights 106, locks 108, doors 110, windows 112, drapes 114, appliances 116, utilities 118, furnace 120, air conditioner 122, medical devices 124, security systems 126, irrigation systems 128, smoke detectors 130, thermostats 132, sound system 134, and swimming pool 136 such that the sensors can electronically activate and deactivate at least one of lights 106, locks 108, doors 110, windows 112, drapes 114, appliances 116, utilities 118, furnace 120, air conditioner 122, medical devices 124, security systems 126, irrigation systems 128, smoke detectors 130, thermostats 132, sound system 134, and swimming pool 136.

System 10 also notifies the home owner by transmitting an electronic message to client system 14 from server system 12 that provides the home owner with M&A information, monitored M&A data, and M&A tasks performed with the home.

HIS 92 also includes a service provider section 150 that includes service provider contact information 152 for each item monitored within the home and surrounding property. Service provider contact information includes a name of each service provider 154, an address for each service provider 156, a telephone number for each service provider 158, and an e-mail address for each service provider 160. When a monitored item requires service, system 10 will determine the item that requires service, access database 20, retrieve service provider contact information 152 assigned to the item requiring service, and electronically contact the retrieved service provider. System 10 will notify the service provider of the item that requires service and will schedule a service call with ten service provider. The service required and scheduled can include, but is not limited to, for example, maintenance or repair work on a monitored item within the home or on the surrounding property or it can include replenishing supplies or products used within the home or on the surrounding property, e.g., food supplies, household cleaning supplies, or swimming pool supplies, that are monitored by system 10.

System 10 accumulates a variety of confidential data, and therefore, has different access levels to control and monitor the security of the system. Authorization for access is assigned by system administrators on a need to know basis. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4B:
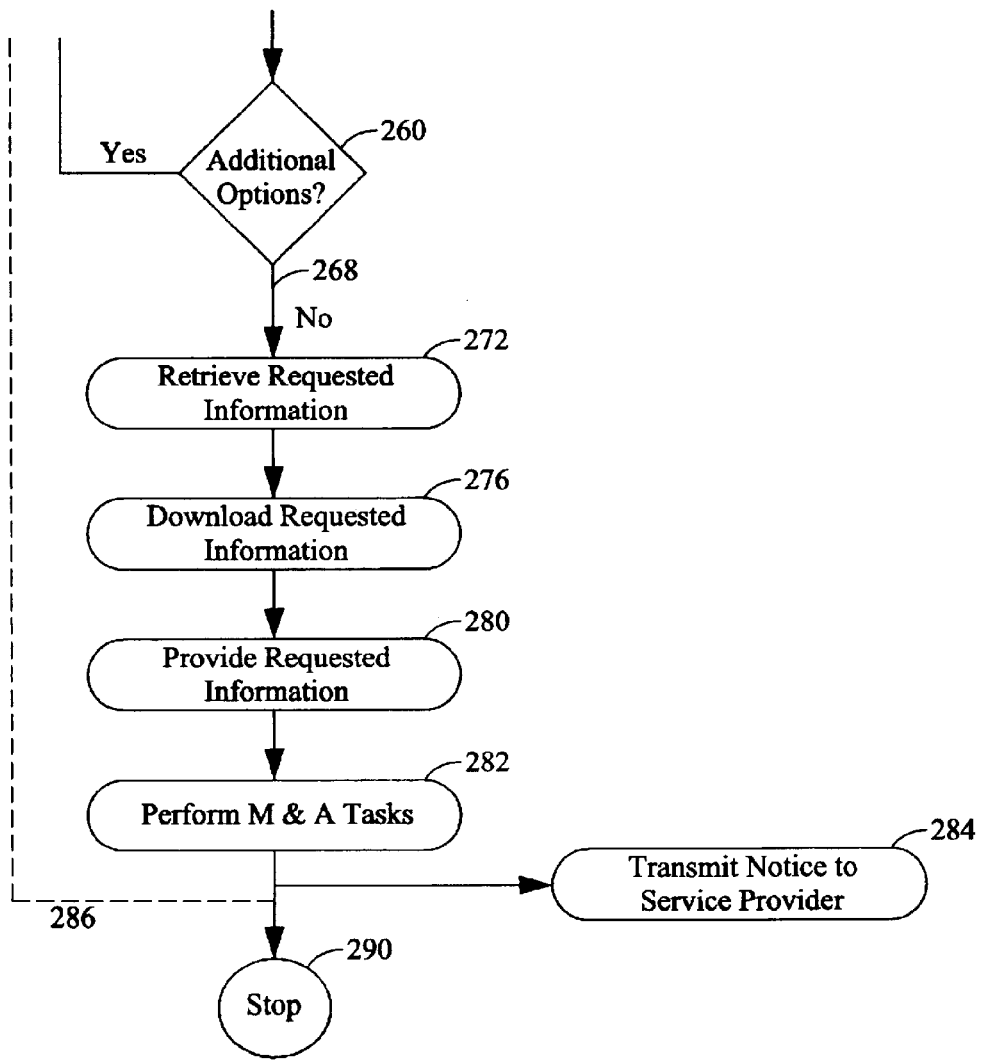
FIG. 4B is a second portion of a flowchart illustrating an exemplary processes that may be employed by the system shown in FIG. 1.

FIGS. 4A and 4B are a flowchart 200 illustrating an exemplary processes that may be employed by system 10 (shown in FIG. 1) to facilitate use. Initially, the user accesses 210 a user interface such as a home page 220 of the web site through client system 14 (shown in FIG. 1). In one embodiment, client system 14, as well as server system 12, are protected from access by unauthorized individuals. The user logs-in 230 to system 10 using a password (not shown) or a security number for security reasons. Client system 14 is configured to receive 232 an electronic notice of M&A information, monitored M&A data, and M&A tasks performed from server system 12. Client system 14 displays 240 options available to the user through links, check boxes, or pull-down lists. After the user selects 244 an option (in one embodiment, relating to the address of the home) from the available links, the request is transmitted 248 to server system 12. Transmitting 248 the request is accomplished, in one embodiment, either by click of a mouse or by a voice command. After server system 12 (shown in FIG. 1) receives 252 the request, server system 12 accesses 256 database 20 (shown in FIG. 1).

System 10 determines 260 if additional narrowing options are available. In one embodiment, additional narrowing options include monitored M&A data and M&A tasks selection pull-down lists. If additional narrowing options are available 264, system 10 displays 240 the options relating to the prior option selected by the user on client system 14. The user selects 244 the desired option and transmits the request 248. Server system 12 receives the request 252 and accesses 256 database 20. When system 10 determines that additional options 260 are not available 268, system 10 retrieves 272 requested information from database 20. The requested information is downloaded 276 and provided 280 to client system 14 from server 12. If the request also includes a request to perform a M&A task within the home, system 10 will activate or deactivate the plurality of sensors to perform 282 the requested M&A task. Client system 14 will also transmit a notice 284 to service provider workstation 56 (shown in FIG. 2) relating to an item monitored within the home that requires service. The user can continue to search 286 database 20 for other information or exit 290 from system 10.

Figure 5:
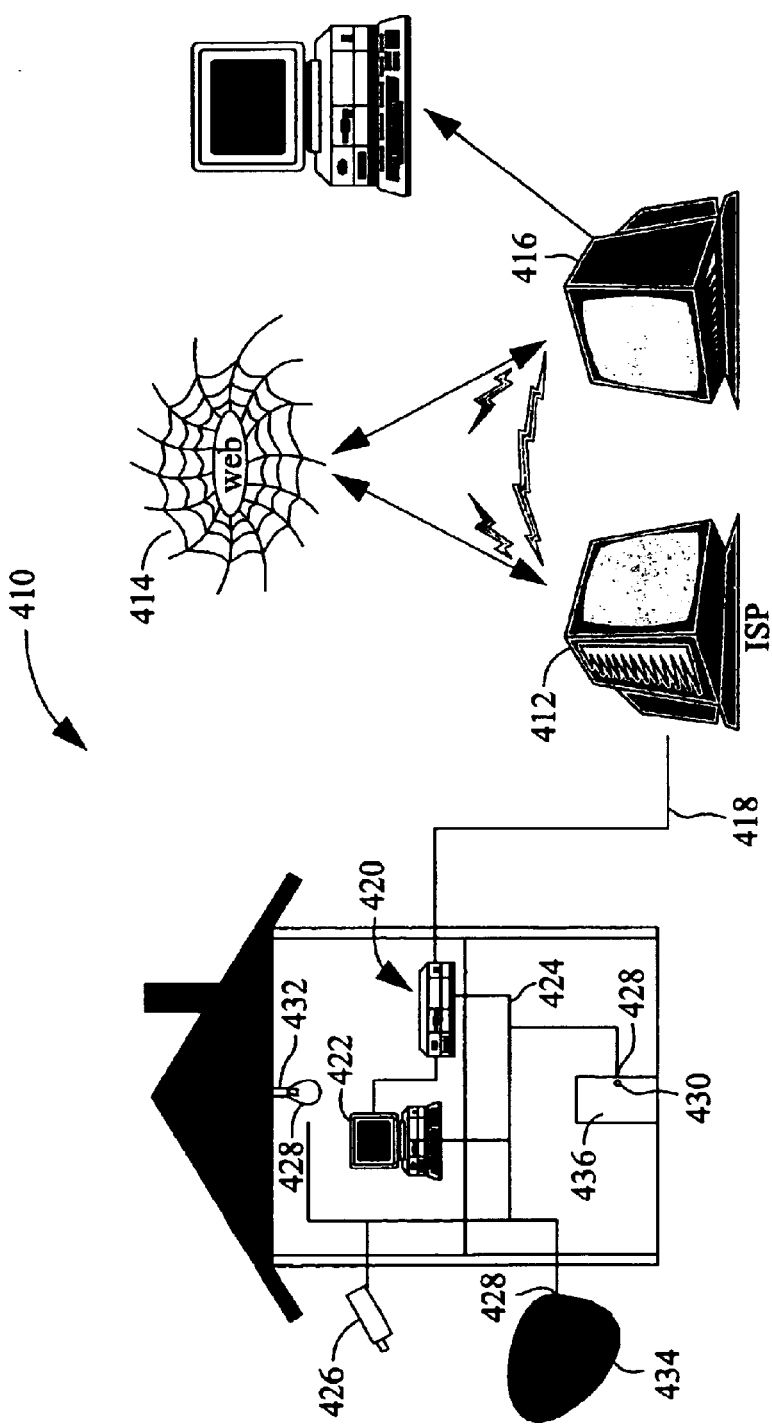
FIG. 5 is an exemplary embodiment of the system shown in FIG. 1 connected to the Internet.

FIG. 5 shows an exemplary embodiment of system 410 including an internet service provider 412, an Internet 414, a remote computer 416, a telephone land-line connection 418, a local gateway server 420, a home computer 422, a local area network 424, a plurality of video cameras 426, and a plurality of sensors 428. Remote computer 416 accesses internet service provider 412 via Internet 414. Internet service provider 412 is electrically connected to local gateway server 420, which is connected to home computer 422 and local area network 424. Local area network 424 is connected to plurality of sensors 428 and plurality of video cameras 426. Plurality of sensors 428 are connected to a plurality of door locks 430, an electricity system 432, a cooling system (not shown in FIG. 5), a heating system (not shown in FIG. 5), an irrigation system (not shown in FIG. 5), a swimming pool 434, a plurality of windows (not shown in FIG. 5), and a plurality of appliances (not shown in FIG. 5). In addition, home automation system 410 includes a video door bell (not shown in FIG. 5) connected to at least one of a front door 436, a rear door (not shown in FIG. 5), and a side door (not shown in FIG. 5) of the home. In one embodiment, the plurality of sensors 428 are connected to appliances within the home including, but not limited to, at least one of a dishwasher, a refrigerator, a stove, a washing machine, a dryer, a microwave, and a range. Sensors 428 can also be connected to other appliances not mentioned hereinabove.

Sensors 428 monitor the appliances to determine whether they are operating correctly. Sensors 428 also control activation/deactivation of the appliances. In one embodiment, a cooling system includes an air conditioning system. In another embodiment, a heating system includes at least one of a natural gas fired furnace and an electric furnace. In one embodiment, sensors 428 detect smoke within the home and transmit an electrical signal via local area network 424 and local gateway 420 to at least one of a fire department, a police department, and a security service. In another embodiment, sensors 428 detect audio when decibel values exceed a predetermined value set by the user and transmit an electrical signal via local area network 424 and local gateway 420 to at least a police department and a security service. In yet another embodiment, sensors 428 detect at least one of breaking glass and scoring glass and transmit an electrical signal via local area network 424 and gateway 420 to at least a police department.

Video cameras 426 and sensors 428 monitor a plurality of activities within the home. More specifically, cameras 426 and sensors 428 monitor the movement of persons within the home. In one embodiment, video cameras 426 and sensors 428 record who is inside the home, what time they arrived, what areas of the house they are accessing, and a time period they accessed specific areas. Furthermore, video cameras 426 and sensors 428 record activities on the surrounding property of the home, e.g., monitoring an exterior of the home. Video cameras 426 and sensors 428 record and identify persons attempting to access unapproved areas, as determined by a user, in the home. In one embodiment, video doorbell records anyone seeking entry to the home, and the user remotely unlocks front door 436, rear door, or side door via system 410 when an approved user accesses the video doorbell. In addition, video cameras 426 and sensors 428 transmit this data, collected via local area network 424, to be stored on local gateway server 420. Local gateway server 420 determines trending activities and reports such information to an approved user. In addition, system 410 communicates with remote computer 416 by at least one of a power line carrier communications and RF communications.

Figure 6:
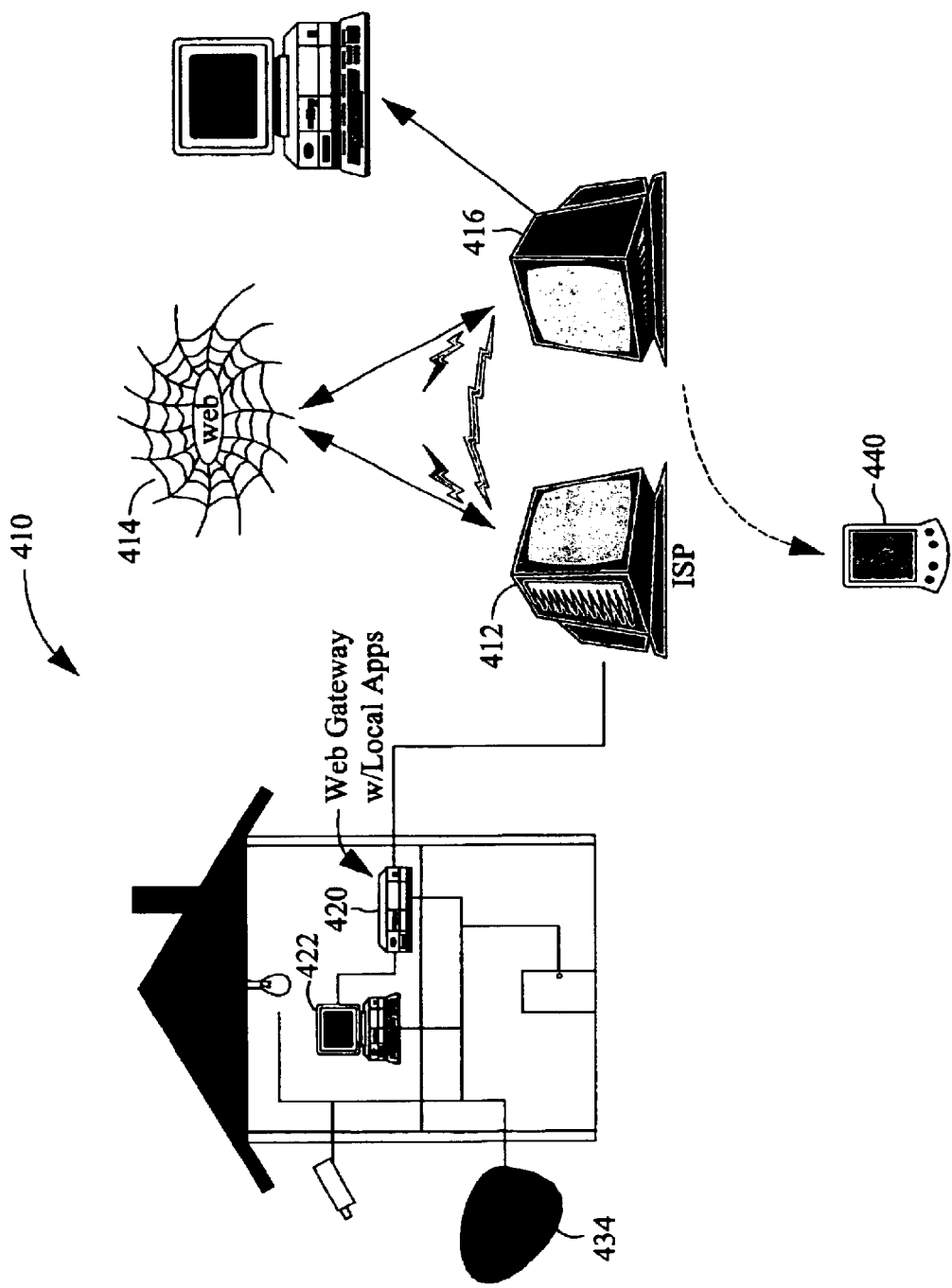
FIG. 6 is an exemplary embodiment of the system shown in FIG. 1 remotely communicating with a Personal Digital Assistant (PDA).

FIG. 6 is an exemplary embodiment of system 410 illustrating a Personal Digital Assistant (PDA) 440 remotely communicating with system 410. PDA 440 communicates with system 410 via at least a leased land-line communications, Internet 414, power line carrier communications, and RF communications. The information stored on local gateway server 420 can be accessed by home computer 422 or can be accessed remotely by computer 416 connected to internet service provider 412 via Internet 414. In addition, a user remotely accesses system 410 using at least one of PDA 440, and a cellular telephone (not shown in FIG. 6). The user remotely controls activating and deactivating at least one of a plurality of utilities and a plurality of appliances. For example, the user can access system 410 to determine a temperature of the home, and can remotely activate the cooling system to reduce the temperature, or activate the heating system to increase the temperature. In an alternative embodiment, the user can access system 410 to activate or deactivate an appliance, such as a dishwasher. In a further alternative embodiment, the user can use PDA 440 to access system 410 to set a temperature for swimming pool 434. In yet a further embodiment, the user can use at least computer 416 and PDA 440 to access records stored in local gateway 420 to review who has accessed the home, at what time, what rooms were accessed, and for what duration of time. In an additional embodiment, the user can remotely access system 410 to remotely control the irrigation system. In yet another embodiment, the user allows third parties, e.g., delivery persons, cleaning services, real-estate agents, and landscapers, to access the home through system 410. In another embodiment, cleaning services and food supply delivery persons are provided access to the home through system 410 based on a regular schedule inputted into system 410.

Working parents that have latch-key children are concerned about obvious dangers within a home like who may enter the house or apartment, whether a child is permitted to bring a friend to the house, and whether a child has entered a prohibited area of the house. Ultimately, the main concern of most parents is for their child's safety, including knowing when the child arrived home, what the child is doing at home, if any visitors or intruders are at the home, that all utilities and appliances are functioning properly, and all doors are secured and locked. In addition to the safety of their children, it is a concern for working parents to provide service people access to a home. The present invention facilitates monitoring and automating a home using a web-based system. The system allows a home owner to monitor and control M&A information through a client system. Additionally, the system also electronically notifies the home owner, providing the home owner with the monitored M&A data and a report of the M&A tasks performed within the home. Lastly, the system is capable of monitoring a plurality of items in the home and on the surrounding property, such that an item requiring service can be detected. After the system detects an item that requires service, the system can electronically contact a service provider, and advise the service provider of the service required. The system can also schedule a service call for that item with a service provider.

While the invention has been described in terms of various specific embodiments, those skilled in the art will recognize that the invention can be practiced with modification within the spirit and scope of the claims.

What is claimed is:

1. A method of monitoring and automating a home using a network-based system including a server system coupled to a centralized database, at least one client system, and a plurality of sensors positioned throughout the home, said method comprising the steps of:

receiving monitoring and automation (M&A) information from the client system;

storing M&A information into the centralized database;

cross-referencing M&A information;

updating the centralized database periodically to maintain M&A information;

monitoring M&A information within the home through the plurality of sensors, wherein monitoring M&A information comprises:

recording, by a plurality of sensors, a date, a start time, an end time, and a duration of time an area of the home is occupied; and transferring from the sensors to the client system a date, a start time, an end time, and a duration of time an area of the home is occupied;

performing M&A tasks in the home using the plurality of sensors based on M&A information inputted into the client system and monitored M&A data; and notifying a home owner of the monitored M&A data and the M&A tasks performed within the home.

2. A method in accordance with claim 1 wherein receiving M&A information comprises:

receiving a description of the home and surrounding property including at least one of a layout of the home, a layout of any buildings on the surrounding property, a description of the surrounding property; and receiving information relating to at least one of lights, locks, doors, windows, drapes, appliances, utilities, furnace, air conditioner, medical devices, security systems, irrigation systems, smoke detectors, thermostats, sound system, swimming pool, occupancy, and access restrictions located within the home and the surrounding property.

3. A method in accordance with claim 1 wherein receiving M&A information comprises:

displaying information on the client system that prompts a user to input the location of the home;

inputting updated M&A information into the client system; and inputting M&A tasks to be performed at the home through the client system.

4. A method in accordance with claim 1 wherein cross-referencing M&A information comprises comparing M&A information inputted into the client system with M&A information stored on the centralized database.

5. A method in accordance with claim 1 wherein monitoring M&A information comprises positioning at least one of a plurality of video cameras and the plurality of sensors throughout the home and surrounding property such that movement of persons within the home and on the surrounding property is recorded, the video cameras and the sensors electronically connected to the client system.

6. A method in accordance with claim 5 wherein monitoring M&A information further comprises employing at least one of the video cameras and the sensors to record and identify persons attempting to access restricted areas of the home.

7. A method in accordance with claim 1 wherein monitoring M&A information comprises positioning the sensors on at least one window within the home such that a condition of the window is recorded, the condition of the window includes at least one of locked, unlocked, open, closed, vibrating, and broken.

8. A method in accordance with claim 1 wherein monitoring M&A information comprises positioning the sensors on at least one door within the home such that a condition of the door is recorded, the condition of the door including at least one of locked, unlocked, open, closed, vibrating, and broken.

9. A method in accordance with claim 1 wherein monitoring M&A information comprises positioning the sensors on at least one of walls, floors, ceilings, lights, drapes, appliances, utilities, furnace, air conditioner, medical devices, security systems, irrigation systems, smoke detectors, thermostats, sound system, swimming pool, and driveway within the home and on the surrounding property such that condition of the wails, floors, ceilings, lights, drapes, appliances, utilities, furnace, air conditioner, medical devices, security systems, irrigation systems, smoke detectors, thermostats, sound system, swimming pool, and driveway is recorded.

10. A method in accordance with claim 1 wherein performing M&A tasks comprises positioning the sensors on at least one window within the home such that the sensors can electronically activate and deactivate a lock on the window.

11. A method in accordance with claim 1 wherein performing M&A tasks comprises positioning the sensors on at least one door within the home such that the sensors can electronically activate and deactivate a lock on the door.

12. A method in accordance with claim 1 wherein performing M&A tasks comprises positioning the sensors on at least one of lights, drapes, appliances, utilities, furnace, air conditioner, medical devices, security systems, irrigation systems, smoke detectors, thermostats, sound system, and swimming pool within the home and on the surrounding property such that the sensors can electronically activate and deactivate at least one of lights, drapes, appliances, utilities, furnace, air conditioner, medical devices, security systems, irrigation systems, smoke detectors, thermostats, sound system, and swimming pool.

13. A method in accordance with claim 1 wherein notifying a home owner comprises transmitting an electronic message to the client system from the server system that provides the home owner with M&A information for the home and surrounding property.

14. A method in accordance with claim 1 wherein notifying a home owner comprises transmitting an electronic message to the client system from the server system providing the home owner with the monitored M&A data.

15. A method in accordance with claim 1 wherein notifying a home owner comprises transmitting an electronic message to the client system from the server system providing the home owner with the M&A tasks performed at the home and surrounding property.

16. A method in accordance with claim 1 further comprising connecting the client system and the server system via a network that includes one of a wide area network, a local area network, an intranet and the Internet.

17. A method in accordance with claim 1 further comprising connecting the system to at least a cell phone and a PDA such that the system can be remotely controlled.

18. A method of monitoring and automating a home using a network-based system including a server system coupled to a centralized database, at least one client system, a plurality of sensors positioned throughout the home, and a service provider system, said method the steps of:
receiving monitoring and automation (M&A) information from the client system;
storing M&A information into the centralized database;
cross-referencing M&A information;
updating the centralized database periodically to maintain M&A information;
monitoring M&A information within the home through the plurality of sensors;
performing M&A tasks in the home through the plurality of sensors based on M&A information inputted into the client system and monitored M&A data;
notifying a home owner of the monitored M&A data and the M&A tasks performed within the home;
contacting the service provider system to request and schedule a service to be performed on a monitored device within the home based on the M&A information inputted into the client system and the monitored M&A data; and
automatically schedule, with the service provider system, the service to be performed on the monitored device.

19. A method in accordance with claim 18 wherein receiving M&A information comprises:
receiving a description of the home and surrounding property including at least one of a layout of the home, a layout of any buildings on the surrounding property, a description of the surrounding property, and
receiving information relating to at least one of lights, locks, doors, windows, drapes, appliances, utilities, furnace, air conditioner, medical devices, security systems, irrigation systems, smoke detectors, thermostats, sound system, swimming pool, occupancy, and access restrictions located within the home and on the surrounding property.

20. A method in accordance with claim 19 wherein receiving M&A information further comprises receiving contact information relating to at least one service provider for each item monitored and storing it on the centralized database.

21. A method in accordance with claim 20 wherein monitoring the home comprises:
positioning a plurality of sensors on at least one of lights, drapes, appliances, utilities, furnace, air conditioner, medical devices, security systems, irrigation systems, smoke detectors, thermostats, sound system, and swimming pool located within the home and on the surrounding property;
monitoring operational condition of at least one of lights, drapes, appliances, utilities, furnace, air conditioner, medical devices, security systems, irrigation systems, smoke detectors, thermostats, sound system, and swimming pool with the sensors; and
determining whether a monitored item requires service.

22. A method in accordance with claim 21 wherein contacting the service provider system comprises:
determining the monitored item that requires service;
accessing the centralized database;
cross-referencing the monitored item that requires service with the service provider contact information to retrieve a service provider;
transmitting an electronic message from the server system to the retrieved service provider notifying the service provider of the monitored item requiring service and scheduling a service call.

23. A network-based system for monitoring and automating a home, said system comprising:
a client system comprising a browser;
a centralized database for storing information;
a plurality of sensors positioned throughout the home;
a server system configured to be coupled to said client system and said database, said server system further configured to:
receive monitoring and automation (M&A) information from the client system;
store M&A information into the centralized database;
cross-reference M&A information;
update the centralized database periodically to maintain M&A information;
monitor M&A information within the home through the plurality of sensors;
perform M&A tasks in the home through the plurality of sensors based on M&A information inputted into the client system and monitored M&A data; and notify a home owner of the monitored M&A data and the M&A tasks performed within the home, wherein said server system further comprises a receiving component that receives M&A information through the sensors positioned throughout the home and surrounding property such that a date, a start time, an end time, and a duration of time an area of the home is occupied is recorded.

24. A system in accordance with claim 23 wherein said client system further comprises at least one of:
 a displaying component for displaying at least one of a pull-down list, a check box, and hypertext link options relating to M&A information;
 a sending component to send M&A information to the server system;
 a collection component for collecting M&A information and storing on the centralized database;
 a tracking component for tracking M&A information;
 a displaying component for displaying M&A information;
 a receiving component for;
  receiving M&A information from the client system and the plurality of sensors regarding at least one of a layout of the home, a layout of any buildings on surrounding property, a description of the surrounding property; and
  receiving information relating to at least one of lights, locks, doors, windows, drapes, appliances, utilities, furnace, air conditioner, medical devices, security systems, irrigation systems, smoke detectors, thermostats, sound system, swimming pool, occupancy, and access restrictions located within the home and the surrounding property;
 an accessing component for accessing the centralized database and causing retrieved information to be displayed on the client system; and
 a notifying component for electronically notifying a home owner of the monitored M&A data and the M&A tasks performed.

25. A system in accordance with claim 23 wherein said server system further comprises:
 a receiving component for receiving M&A information from a client system and the plurality of sensors;
 a processing component for processing received M&A information against the database containing information collected by a collection component;
 a retrieving component to retrieve M&A information from the database; and
 an activating component to electronically activate and deactivate the plurality of sensors based on M&A information and monitored M&A data.

26. A system in accordance with claim 23 wherein said server system further comprises a receiving component that:
 receives an inquiry from the client system regarding at least one of a layout of the home, a layout of any buildings on surrounding property, a description of the surrounding property; and
 receives information relating to at least one of lights, locks, doors, windows, drapes, appliances, utilities, furnace, air conditioner, medical devices, security systems, irrigation systems, smoke detectors, thermostats, sound system, swimming pool, occupancy, and access restrictions located within the home and the surrounding property.

27. A system in accordance with claim 23 wherein said server system further comprises a receiving component that receives M&A information through the sensors that includes a plurality of video cameras positioned throughout the home and surrounding property such that the movement of persons within the home and on the surrounding property is recorded.

28. A system in accordance with claim 23 wherein said server system further comprises a receiving component that receives M&A information through the sensors that include a plurality of video cameras positioned throughout the home and surrounding property such that a date, a start time, an end time, and a duration of time an area of the home is occupied is recorded.

29. A system in accordance with claim 23 wherein said server system further comprises a receiving component that receives through the sensors M&A information that includes an identity of persons attempting to access restricted areas of the home.

30. A system in accordance with claim 23 wherein said server system further comprises a receiving component that receives M&A information through the sensors positioned on at least one window within the home such that a condition of the window is recorded, the condition of the window includes at least one of locked, unlocked, open, closed, vibrating, and broken.

31. A system in accordance with claim 23 wherein said server system further comprises a receiving component that receives M&A information through the sensors positioned on at least one door within the home such that a condition of the door is recorded, the condition of the door includes at least one of locked, unlocked, open, closed, vibrating, and broken.

32. A system in accordance with claim 23 wherein said server system further comprises a receiving component that receives M&A information through the sensors positioned on at least one of walls, floors, ceilings, lights, drapes, appliances, utilities, furnace, air conditioner, medical devices, security systems, irrigation systems, smoke detectors, thermostats, sound system, swimming pool, and driveway within the home and on surrounding property such that condition of the walls, floors, ceilings, lights, drapes, appliances, utilities, furnace, air conditioner, medical devices, security systems, irrigation systems, smoke detectors, thermostats, sound system, swimming pool, and driveway is recorded.

33. A system in accordance with claim 23 wherein said server system further comprises a receiving component that receives information directly through the client system, and a receiving component that receives information in a predetermined format established for inputting M&A information.

34. A system in accordance with claim 23 wherein said server system further comprises a processing component that accomplishes at least one of:
 searching and processing received M&A information from the client system and the plurality of sensors against the database containing information collected by a collection component;
 cross-referencing the received M&A information from the client system and the plurality of sensors against the information contained on the database; and
 electronically activating and deactivating the plurality of sensors based on the M&A information and the monitored M&A data.

35. A system in accordance with claim 23 wherein said server system further comprises an activating component that includes the sensors positioned on at least one window within the home such that the sensors can electronically activate and deactivate a lock on the window.

36. A system in accordance with claim 23 wherein said server system further comprises an activating component that includes the sensors positioned on at least one door within the home such that the sensors can electronically activate and deactivate a lock on the door.

37. A system in accordance with claim 23 wherein said server system further comprises an activating component that includes the sensors positioned on at least one of lights, drapes, appliances, utilities, furnace, air conditioner, medical devices, security systems, irrigation systems, smoke detectors, thermostats, sound system, and swimming pool within the home and on surrounding property such that the sensors can electronically activate and deactivate at least one of lights, drapes, appliances, utilities, furnace, air conditioner, medical devices, security systems, irrigation systems, smoke detectors, thermostats, sound system, and swimming pool.

38. A system in accordance with claim 23 wherein said server system further comprises a notifying component that transmits an electronic message to the client system from the server system providing the home owner with the monitored M&A data.

39. A system in accordance with claim 23 wherein said server system further comprises a notifying component that transmits an electronic message to the client system from the server system providing the home owner with the M&A tasks performed at the home and surrounding property.

40. A system in accordance with claim 23 wherein said system further comprises a service provider system.

41. A system in accordance with claim 40 wherein said server system further comprises a receiving component that receives contact information relating to at least one service provider for each item monitored by the plurality of sensors.

42. A system in accordance with claim 41 wherein said server further comprises a contacting component that transmits an electronic message from the server system to a service provider notifying the service provider of a monitored item requiring service and scheduling a service call.

43. A system in accordance with claim 23 wherein said system further operates via at least one of power line carrier communications and RF communications.

44. A system in accordance with claim 23 wherein said system controlled remotely by a Personal Digital Assistant (PDA) communicating via at least one of power line carrier communications and RF communications.

* * * * *

UNITED STATES PATENT AND TRADEMARK OFFICE
CERTIFICATE OF CORRECTION

| | | |
|---|---|---|
| PATENT NO. | : 6,950,725 B2 | Page 1 of 1 |
| APPLICATION NO. | : 09/683284 | |
| DATED | : September 27, 2005 | |
| INVENTOR(S) | : von Kannewurff et al. | |

It is certified that error appears in the above-identified patent and that said Letters Patent is hereby corrected as shown below:

In Claim 9, column 11, line 2, delete "wails" and insert therefor -- walls --.

In Claim 18, column 11, line 51, between "method" and "the" insert -- comprising --.

In Claim 24, column 13, line 20, delete "component for;" and insert therefor -- component for: --.

Signed and Sealed this

Thirtieth Day of October, 2007

JON W. DUDAS
*Director of the United States Patent and Trademark Office*